United States Patent
Johnson et al.

(10) Patent No.: US 7,324,263 B2
(45) Date of Patent: Jan. 29, 2008

(54) ELECTROPHORETIC MULTI-COLOR DISPLAY DEVICE

(75) Inventors: Mark Thomas Johnson, Eindhoven (NL); Alexander Victor Henzen, Heerlen (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 10/545,638

(22) PCT Filed: Feb. 5, 2004

(86) PCT No.: PCT/IB2004/050077

§ 371 (c)(1),
(2), (4) Date: Aug. 16, 2005

(87) PCT Pub. No.: WO2004/074921

PCT Pub. Date: Sep. 2, 2004

(65) Prior Publication Data

US 2006/0152473 A1    Jul. 13, 2006

(30) Foreign Application Priority Data

Feb. 20, 2003    (EP) .................................. 03100397

(51) Int. Cl.
*G02B 26/00*    (2006.01)
*G09G 3/34*    (2006.01)
*G03G 17/04*    (2006.01)

(52) U.S. Cl. ..................... 359/296; 345/107; 430/32

(58) Field of Classification Search ................ 359/296; 345/107; 430/32
See application file for complete search history.

(56) References Cited

U.S. PATENT DOCUMENTS 6,850,355 B2 *  2/2005  Liang et al. ................. 359/296
2002/0167480 A1  11/2002  Johnson et al.

FOREIGN PATENT DOCUMENTS

WO    WO03012542 A1    2/2003
WO    WO03050607 A1    6/2003

\* cited by examiner

*Primary Examiner*—Ricky Mack
*Assistant Examiner*—William C Choi

(57) ABSTRACT

The electrophoretic multi-color display device has a plurality of cells (10, 10', 10", . . . ) with an electrophoretic medium (14) and pixel electrodes (11, 11', 11", . . . ) for selecting a subgroup of cells. A color filter array (13) is associated with the pixel electrodes. The color filter array (13) and the pixel electrodes (11, 11', 11", . . . ) are provided at the same side of the electrophoretic medium (14). Preferably, the cells (10, 10', 10", . . . ) of the color filter array (13) are arranged according to a matrix and are disposed along lines registering with the pixel electrodes (11, 11', 11", . . . ). Preferably, an insulating material (17) with a relatively low refractive index is provided between the pixel electrodes (11, 11', 11" . . . ) and the color filter array (13). Preferably, the insulating material (17) is selected from the group formed by a fluor-polymer, a low-dielectric inorganic film and a low-dielectric nano-porous film.

14 Claims, 3 Drawing Sheets

ELECTROPHORETIC MULTI-COLOR DISPLAY DEVICE

The invention relates to an electrophoretic multi-color display device.

Electrophoretic display devices are based on the motion of charged, usually colored particles under the influence of an electric field between two extreme states having a different transmissivity or reflectivity. With these display devices, dark (colored) characters can be imaged on a light (colored) background, and vice versa. Electrophoretic display devices are notably used in display devices taking over the function of paper and are often referred to as "electronic paper" or "paper white" applications (electronic newspapers, electronic diaries).

For mobile display applications, electrophoretic display devices offer an advantageous performance including relatively low power consumption due to long-term image stability, relatively high white state reflectivity and contrast, and "paper-like" optics enhancing readability and legibility. The optical performance of these reflective display devices makes them relatively insensitive to ambient lighting intensity and direction. Electrophoretic display devices provide a viewing angle which is practically as wide as that of normal paper. The performance is such that supplemental illumination solutions such as front lights are not required for many devices.

Optical materials based on microencapsulated electrophoretic ink have been successfully integrated with traditional a-Si thin-film transistors (TFTs), a-Si TFTs built on conformable steel foils or organic TFTs. Facile mechanical integration of the material to active matrices leads to substantial simplifications in their cell assembly process compared to that of liquid crystal display (LCD) devices. In monochrome electrophoretic displays devices, for example, a flexible plastic front sheet coated with indium tin oxide (ITO) and the electrophoretic medium is laminated directly to a thin-film transistor backplane. After lamination, an edge seal is applied around the perimeter of the display device. In principle, no polarizer films, alignment layers, rubbing processes, or spacers are required.

It has been shown that many of the performance advantages of an electrophoretic display device are preserved when a color filter array is properly designed and integrated into the display device. In electrophoretic multi-color display devices, the white and dark state reflectivities, as well as the color saturations, are relatively insensitive to illumination and viewing conditions.

A drawback of the known electrophoretic multi-color display devices is that the manufacturing (assembly) of the electrophoretic multi-color display devices is relatively complicated.

The invention has for its object to eliminate the above disadvantage wholly or partly. According to the invention, an electrophoretic multi-color display device of the kind mentioned in the opening paragraph for this purpose comprises:

a plurality of cells with an electrophoretic medium, pixel electrodes for selecting a subgroup of cells, a color filter array associated with the pixel electrodes, the color filter array and the pixel electrodes being provided at the same side of the electrophoretic medium.

The inventors have had the insight, that by forming the color filter array and the pixel electrodes at the same side of the electrophoretic medium, the alignment of the color filter array with respect to the pixel electrodes is greatly simplified. In this manner, the manufacturing (assembly) of the electrophoretic multi-color display devices becomes relatively simple.

The known lay-out of an electrophoretic multi-color display device is typically formed in the following manner. On top of a (plastic) sheet provided with a conductive layer, (a layer of) an electrophoretic medium is coated. This (plastic) sheet provided with the electrophoretic medium is laminated on a substrate provided with the pixel electrodes. In general, these pixel electrodes form part of a so-called active matrix substrate. The known electrophoretic multi-color display device is viewed form the side of the (plastic) sheet because of the preferred arrangement of the color filter array with respect to the electrophoretic medium. In the configuration of the electrophoretic multi-color display device according to the invention the color filter array is on the "viewer" side of the display device.

The assembly process of the known electrophoretic multi-color display device, with the pixel electrodes and the color filter array on opposite sides of the electrophoretic medium, is hindered due to the relatively opaque nature of the electrophoretic medium. The electrophoretic medium obscures the alignment of the color filter array with respect to the pixel electrodes.

In the electrophoretic multi-color display device according to the invention, the pixel electrodes and the color filter array are on the same side of the electrophoretic medium. This arrangement of the pixel electrodes and the color filter array with respect to the electrophoretic medium implies that the electrophoretic multi-color display device according to the invention is viewed from the opposite side as in the known display device. The electrophoretic multi-color display device is viewed from the "active matrix" side. The electrophoretic layer may be disposed on the active matrix substrate. In a preferred embodiment of the electrophoretic multi-color display device, the electrophoretic layer is formed on a separate (plastic) film or sheet, further comprising the common electrodes.

Normally the color filter array comprises a "red", a "green" and a "blue" cell, which together form a so-called "pixel" of the electrophoretic multi-color display device.

To enable undisturbed viewing of the electrophoretic multi-color display device, the pixel electrodes are, preferably, translucent. Preferably, the pixel electrodes are made from indium tin oxide (ITO) or any other suitable transparent conduction material.

The cells of the color filter array may be arranged in different configurations. Preferably, the cells are arranged in the form of a matrix (with rows and columns). The cells may be individual "dots" for each color wherein each "dot" or cell corresponds with a pixel electrode. In another embodiment, the color are arrange along lines following the rows of pixel electrodes. In a favorable embodiments of the electrophoretic multi-color display device according to the invention, each cell of the color filter array registers with a pixel electrode. In an alternative preferred embodiment of the electrophoretic multi-color display device according to the invention the cells of the color filter array are disposed along lines registering with the pixel electrodes. In addition, the color cells may be configured in various other manners, for instance in a triangular or prismatic lay-out.

Preferably, the pixel electrodes are provided in close contact with the cells with electrophoretic medium. To this end, a preferred embodiment of the electrophoretic multi-color display device according to the invention is characterized in that the pixel electrodes are provided between the cells and the color filter array. If the color filter array is between the pixel electrodes and the cells, there is an undesired voltage drop over the color filter array.

To improve reflectivity of the electrophoretic multi-color display device, a layer with a low refractive index can be applied between the color filter array and the pixel electrodes. To this end, a preferred embodiment of the electrophoretic multi-color display device according to the invention is characterized in that an insulating material with a relatively low refractive index is provided between the pixel electrodes and the color filter array. Providing such a layer with a low refractive index ensures that light scattered back from the electrophoretic medium enters into the substrate layer at an angle which is not lower than the angle for total internal reflection.

Preferably, the insulating material is selected from the group formed by a fluor-polymer, a low-dielectric inorganic film and a low-dielectric nano-porous film. Favorable insulating materials are silicon nitride, silicon oxide, (nano foams of) polymer and aerogel. Such materials have refractive indices in the range from 1 to 1.4. For instance, the refractive index is approximately 1.3 for fluor-polymers.

A preferred embodiment of the electrophoretic multi-color display device according to the invention is characterized in that each of the cells is associated with a thin-film transistor. Preferably, the color filter array and the thin-film transistors are provided on a translucent front window, elements of the color filter array being arranged adjacent to the thin-film transistors.

A preferred embodiment of the electrophoretic multi-color display device according to the invention is characterized in that the electrical contact between the pixel electrodes and the respective thin-film transistor is provided via cut-out portions in the color filter array. When the pixel electrodes are formed on top of the color filter array with a layer of a low-refractive index material in between, the pixel electrodes are be contacted through via-holes, opened in the colour filter array.

A favorable embodiment of the electrophoretic multi-color display device according to the invention is characterized in that the cell of the color filter array comprises a relatively low-refractive index material with a refractive index $n_{li}$ in the range from $1.0 \leq n_{li} \leq 1.5$. By introducing a material with a relatively low refractive index more light can be coupled out of the cell, thereby increasing the brightness of the electrophoretic multi-color display device. Employing a low-refractive index material is based on the recognition that light scattered at an angle higher than the limit angle for total internal reflection can not be coupled out of the cell. By introducing a low-refractive index material the so-called limit angle is increased enabling more light to be issued from the cell.

Light which is incident on the cell is redistributed by diffuse scattering in the known electrophoretic multi-color display device can not escape from the front window if the angle with the normal on the surface of the front window exceeds the limit angle, $\theta_{la}$. If the incoming light flux has a light flux $I_{in}$, and the light that is reflected has a light flux $I_{out}$, the relation between the incident light and the light that is coupled out of the cell is, in first order approximation, given by:

$$I_{out} \leq \frac{I_{in}(1 - \cos(2\theta_{la}))}{2}$$

In the above formula, reflection in the cell is assumed to be Lambertian. The $\leq$-sign in the equation has been introduced to indicate that additional Fresnel losses have been neglected. In Table I the reflected flux $I_{out}$ under normal conditions has been calculated for various values of the refractive index of the front window.

TABLE I

Reflected flux for various values of the refractive index of the front window.

| Refractive index n of front window | Limit angle $\theta_{la}$ | Reflected flux $I_{out}$ |
|---|---|---|
| 1.0 | 90.0° | 1.00 $I_{in}$ |
| 1.1 | 65.4° | 0.83 $I_{in}$ |
| 1.2 | 56.4° | 0.69 $I_{in}$ |
| 1.3 | 50.3° | 0.59 $I_{in}$ |
| 1.4 | 45.6° | 0.51 $I_{in}$ |
| 1.5 | 41.8° | 0.44 $I_{in}$ |
| 1.6 | 38.7° | 0.39 $I_{in}$ |

For a front window made of glass or Poly(EthyleneTerephthalate) (PET) n≈1.5 and only 0.44×$I_{in}$ of the incident light is reflected. For a front window made of PolyCarbonate n≈1.6 only 0.39×$I_{in}$ of the incident light is reflected.

By introducing a low-refractive index material more light can be coupled out of the cells of the color filter array. Preferably, the refractive index of the low-refractive index material is $n_{li} \leq 1.4$.

A preferred embodiment of the electrophoretic multi-color display device according to the invention is characterized in that the low-refractive index material is selected from the group formed by a fluor-polymer, a low-dielectric inorganic film and a low-dielectric nano-porous film. For fluor-polymers the refractive index is approximately 1.3. According to Table I the reflected flux for n≈1.3 increases to 0.59×$I_{in}$, a gain of a factor of 0.59/0.44=1.34 with respect to the known electrophoretic multi-color display devices. Low-dielectric films are for instance found in fluorides such as LiF, which has n≈1.39 or MgF$_2$ which has n≈1.38. Also fluosilicates are known to have a low index of refraction, e.g. MgSiF$_6$ has n≈1.35 and K$_2$SiF$_6$ has n≈1.34. The refractive index of nano-porous films or aerogels can be as low as 1.05-1.1. For n≈1.1 the gain in reflected flux is approximately 2.

A preferred embodiment of the electrophoretic multi-color display device according to the invention is characterized in that the electrophoretic medium is present in a microcapsule. Preferably, the electrophoretic multi-color display device comprises one microcapsule per cell or one microcapsule per sub-cell. The charged electrophoretic particles may be present in a fluid between substrates, but it is alternatively possible for the electrophoretic medium to be present in a microcapsule, often also referred to as a microencapsulated electrophoretic medium.

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

Figure 1:
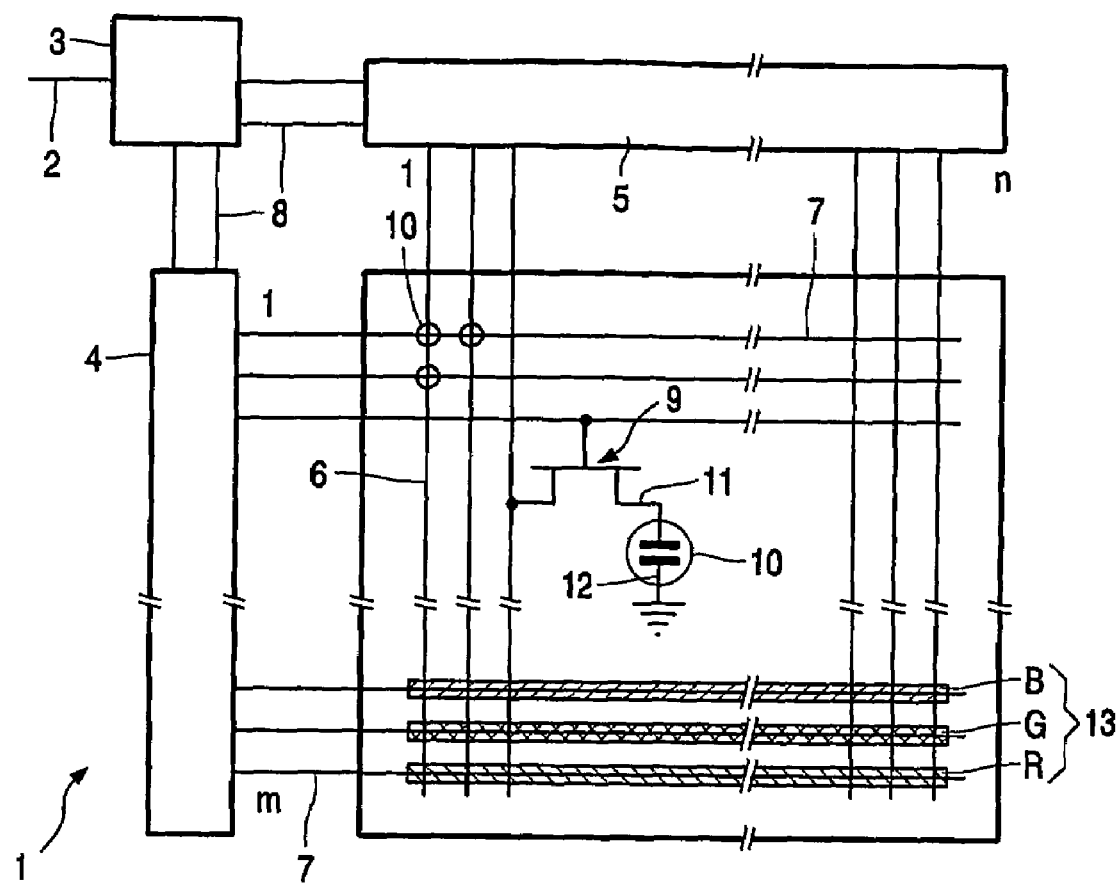
FIG. 1 shows an electric equivalent of a part of an electrophoretic multi-color display device.

FIG. 1 very schematically shows an electric equivalent of a part of an electrophoretic multi-color display device 1 to which the invention is applicable. It comprises a plurality of cells 10 (only one cell is shown in FIG. 1) at the area of crossings of row or selection electrodes 7 and column or data electrodes 6. The selection electrodes 7 numbered from 1 to m in FIG. 1 are consecutively selected by means of a row driver 4, while the data electrodes 6 numbered from 1 to n in FIG. 1 are provided with data via a data register 5. To this end, incoming data 2 are first processed, if necessary, in a processor 3. Mutual synchronization between the row driver 4 and the data register 5 takes place via drive lines 8 connected to the processor 3.

Drive signals from the row driver 4 select the electrodes via thin-film transistors (TFTs) 9 whose gate electrodes are electrically connected to the selection electrodes 7 and whose source electrodes are electrically connected to the data electrodes 6 (referred to as active drive). The signal at the data electrode 6 is transferred via the TFT to a pixel electrode 11, coupled to the drain electrode, of a cell 10. The other electrodes of the cell 10 are connected to, for example, ground, for example, by means of one (or more) so-called common (counter) electrode(s) 12. In the example of FIG. 1, such a TFT 9 with a pixel electrode 11 and a common electrode 12 is shown diagrammatically for one cell 10 only.

Thin-film transistors are not essential to the electrophoretic multi-color display device according to the invention. When transistors are not provided in the electrophoretic multi-color display device, the pixel electrodes are the data electrodes and the common electrodes are the selection electrodes.

FIG. 1 very schematically shows three color elements B, G, R from a color filter array 13. In the example of FIG. 1, the color elements B, G, R are disposed in a linear lay-out. In addition, the respective color lines in the color filter array are disposed in the same direction as the selection electrodes 7. The color medium in the color filter array 13 can be, for example, a light-transmissive colored filter element.

The cells of the color filter array may be arranged in different configurations. The cells may be individual "dots" for each color wherein each "dot" or cell corresponds with a pixel electrode. In further alternative embodiment, each cell of the color filter array registers with a pixel electrode. In addition, the color cells may be configured in various other manners, for instance in a triangular or prismatic lay-out. Alternatively, it may be advantageous to dispose the respective color lines in the color filter array along lines registering with the pixel electrode 11.

Figure 2:
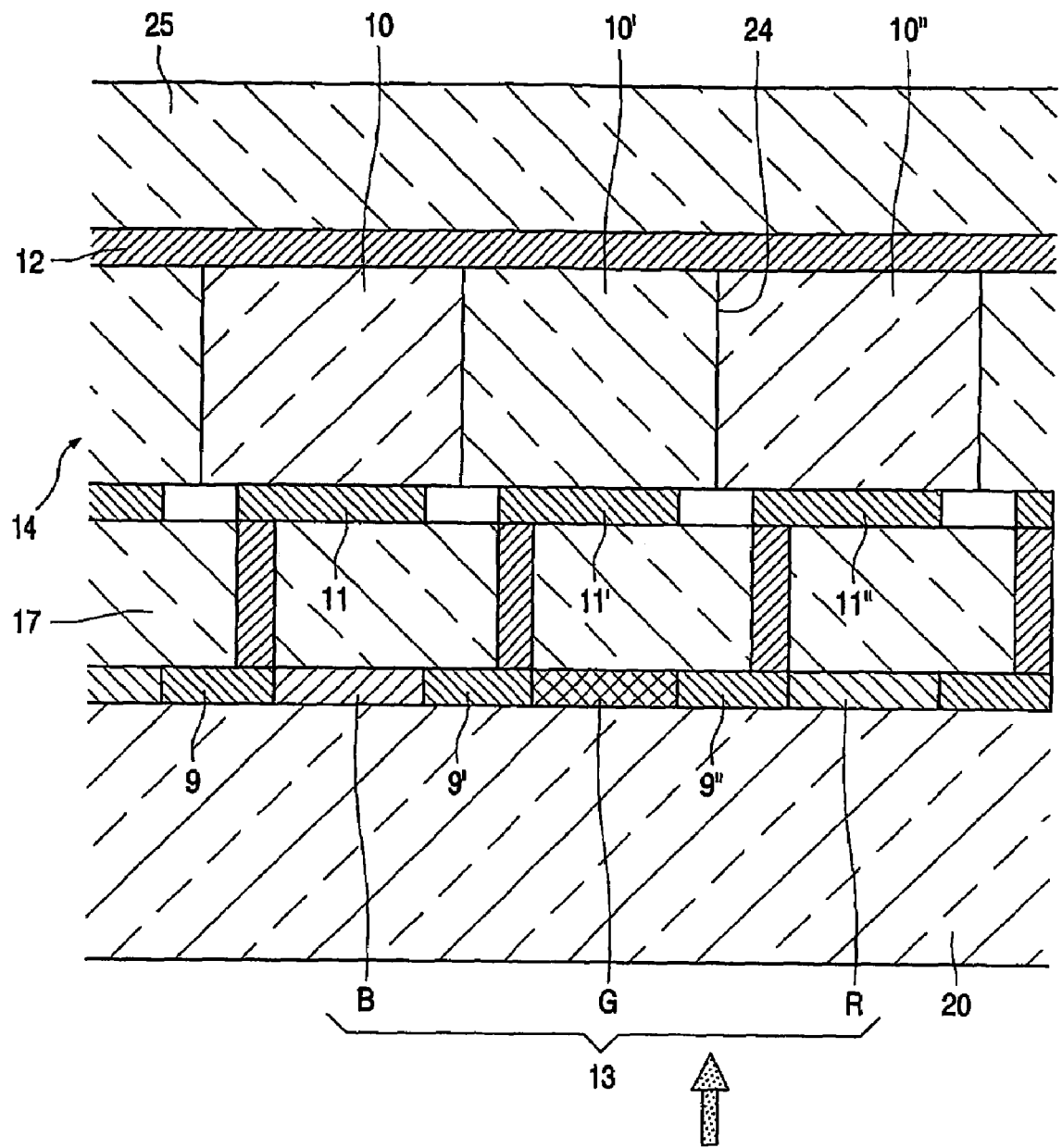
FIG. 2 shows a number of cells of an electrophoretic multi-color display device according to an embodiment of the invention in cross-section.

FIG. 2 very schematically and not to scale shows a number of cells 10, 10', 10", . . . of an electrophoretic multi-color display device according to an embodiment of the invention in cross-section. A translucent front window 20 is provided with a matrix of thin-film transistors 9, 9', 9", . . . . Preferably, the front window 20 is made of glass or Poly(EthyleneTerephthalate) (PET). In between the thin-film transistors 9, 9', 9", . . . the color filter array 13 is disposed consisting of three color elements B, G, R Electrophoretic cell 10 is associated with the color element B, electrophoretic cell 10' is associated with the color element G, and electrophoretic cell 10" is associated with the color element R of the color filter array 13. Three laterally adjacent cells 10, 10', 10", . . . create an electrophoretic reflective color pixel. In FIG. 2 there are also shown walls 24 between each of the cells 10, 10', 10", . . . to figuratively demarcate the sides of each cell. These side cell walls 24 are shown for illustrative purpose and do not have to be present in the actual embodiment.

In FIG. 2, pixel electrodes 11, 11', 11", . . . are provided above the color filter array 13. Preferably, the pixel electrodes 11, 11', 11", . . . are translucent and are, preferably, made from indium tin oxide (ITO) or any other suitable transparent conduction material. The translucent front window 20 provided with the array of the thin-film transistors 9, 9', 9", . . . forms a known active matrix substrate which is employed in the world of liquid crystal display devices.

In the example of FIG. 2 a layer of an insulating material 17 with a relatively low refractive index is provided between the color filter array 13 and the pixel electrodes 11, 11', 11" . . . . The relatively low refractive index of the insulating material 17 improves the reflectivity of the electrophoretic multi-color display device.

Counter electrodes, the so-called common electrodes 12 are provided at the side of the cells 10, 10', 10", . . . with the electrophoretic medium 14 facing away from the pixel electrodes 11, 11', 11", . . . . The common electrodes 12 are provided on a back sheet 25.

Holes are provided in the insulating material 17 to enable electrical contact between the pixel electrodes 11, 11', 11", . . . and the respective thin-film transistors 9, 9', 9", . . . . In an alternative embodiment, the electrical contact between the pixel electrodes and the respective thin-film transistor is provided via cut-out portions in the color filter array.

Contrary to the known display device, the electrophoretic multi-color display device according to the invention is viewed from the active matrix side of the display.

Figure 3A:
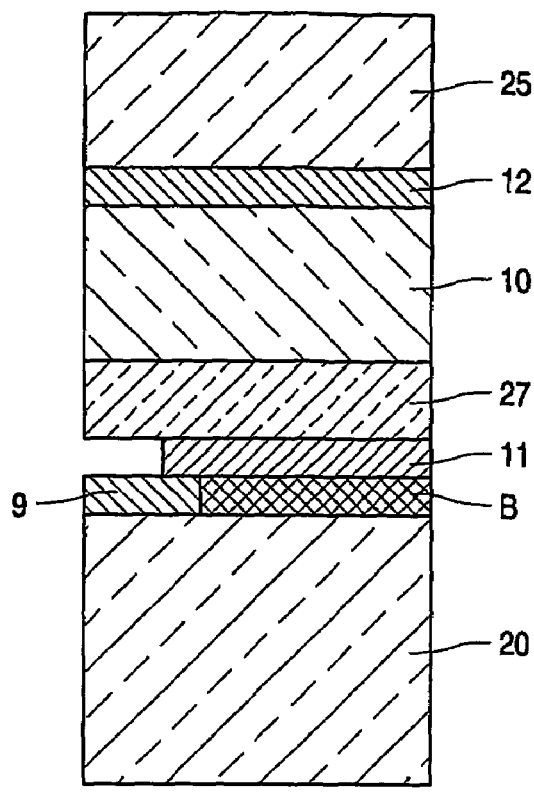
FIGS. 3A and 3B show cells of an electrophoretic multi-color display device according to further embodiments of the invention in cross-section.

FIG. 3A shows a (single) cell of an electrophoretic multi-color display device according to a further embodiment of the invention in cross-section. In the example of FIG. 3, a layer of a low-refractive index material 27 is provided between the electrophoretic medium 10 and the pixel electrode 11 connected to the TFT 9 which is disposed adjacent one of the three color elements ("B") associated with the translucent front window 20. The common electrodes 12 is provided on the back sheet 25.

In an alternative embodiment, the low-refractive index material is provided between the translucent front window and the switching electrode associated with the translucent front window. Preferably, the thickness of the switching electrode is less than or equal to the wavelength of the light.

By adding one or more layers of a material with low refractive index, the brightness of the electrophoretic multi-color display device is improved. The closer the refractive index of the low-index medium matches that of air, the more brightness improvement is realized. Preferably, the refractive index of the layer of low-refractive index material 27 is $n_{li} \leq 1.4$. Materials in the desired range of refractive indices are available. Preferably, the low-refractive index material 27 is selected from the group formed by a fluor-polymer, a low-dielectric inorganic film and a low-dielectric nano-porous film. For fluor-polymers the refractive index is approximately 1.3 whereas the refractive index of nano-porous films or aero-gels is approximately 1.1. Low-dielectric films are for instance found in fluorides such as LiF, which has $n \approx 1.39$ or $MgF_2$ which has $n \approx 1.38$. In addition, fluosilicates are known to have a low index of refraction, e.g. $MgSiF_6$ has $n \approx 1.35$ and $K_2SiF_6$ has $n \approx 1.34$. The refractive index of nano-porous films or aerogels can be as low as 1.05-1.1.

Figure 3B:
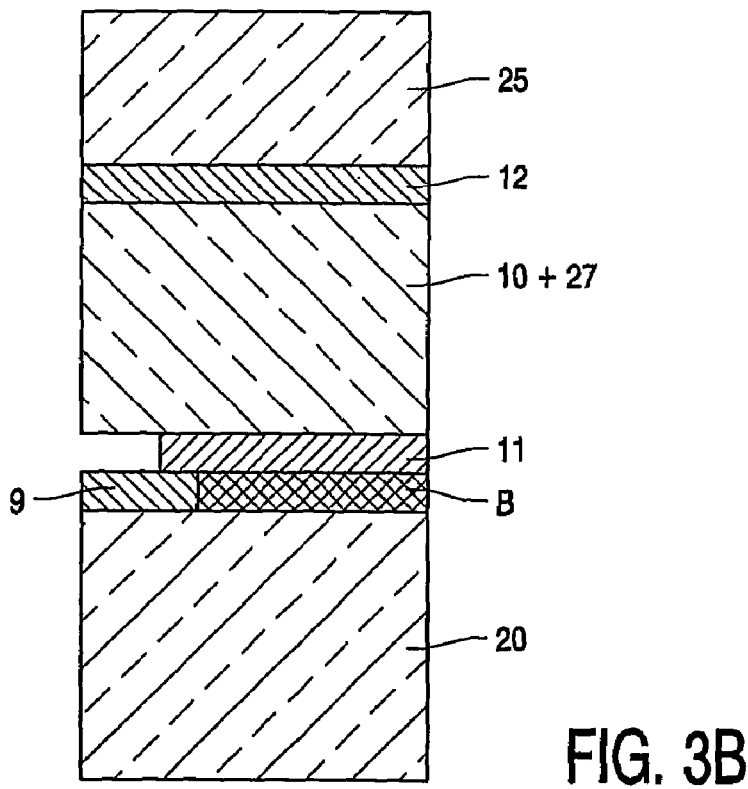

FIG. 3B shows a cell of an electrophoretic multi-color display device according to a further embodiment of the invention in cross-section. In the example of FIG. 3B, the cell 10 comprises a low-refractive index material 27 with a low-refractive index material (indicated in FIG. 3B by the reference numerals "10+27").

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electrophoretic multi-color display device comprising:
   a plurality of cells with an electrophoretic medium,
   pixel electrodes for selecting a subgroup of cells,
   a color filter array associated with the pixel electrodes,
   the color filter array and the pixel electrodes being provided at the same side of the electrophoretic medium, wherein an insulating material with a relatively low refractive index is provided between the pixel electrodes and the color filter array and wherein the insulating material is selected from the group formed by a fluor-polymer, a low-dielectric inorganic film and a low-dielectric nano-porous film.

2. The electrophoretic multi-color display device as claimed in claim 1, wherein the cells are arranged according to a matrix and in that each cell of the color filter array registers with a pixel electrode.

3. The electrophoretic multi-color display device as claimed in claim 1, wherein the cells are arranged according to a matrix and in that the cells of the color filter array are disposed along lines registering with the pixel electrodes.

4. The electrophoretic multi-color display device as claimed in claim 1, wherein the pixel electrodes are provided between the cells and the color filter array.

5. An electrophoretic multi-color display device as claimed in claim 1, wherein each of the cells is associated with a thin-film transistor.

6. The electrophoretic multi-color display device as claimed in claim 5, wherein the color filter array and the thin-film transistors are provided on a translucent front window, elements of the color filter array being arranged adjacent to the thin-film transistors.

7. The electrophoretic multi-color display device as claimed in claim 1, wherein the cell comprises a low-refractive index material with a refractive index $n_{li}$ in the range from $1.0 n_{li} \leq 1.5$.

8. The electrophoretic multi-color display device as claimed in claim 7, wherein the refractive index of the low-refractive index material is $n_{li} \leq 1.4$.

9. The electrophoretic multi-color display device as claimed in claim 7, wherein the low-refractive index material is selected from the group formed by a fluor-polymer, a low-dielectric inorganic film and a low-dielectric nano-porous film.

10. The electrophoretic multi-color display device as claimed in claim 1, wherein the electrophoretic medium is present in a microcapsule.

11. The electrophoretic multi-color display device as claimed in claim 10, with one microcapsule per cell or with one microcapsule per sub-cell.

12. An electrophoretic multi-color display device comprising:
    a plurality of cells with an electrophoretic medium,
    pixel electrodes for selecting a subgroup of cells,
    a color filter array associated with the pixel electrodes,
    the color filter array and the pixel electrodes being provided at the same side of the electrophoretic medium, wherein the electrical contact between the pixel electrodes and a respective thin-film transistor is provided via cut-out portions in the color filter array.

13. A method of forming an electrophoretic multi-color display device, the method comprising the acts of:
    forming a plurality of cells with an electrophoretic medium,
    forming pixel electrodes for selecting a subgroup of cells,
    forming a color filter array associated with the pixel electrodes,
    forming an insulating material with a relatively low refractive index between the pixel electrodes and the color filter array,
    wherein the insulating material is selected from the group formed by a fluor-polymer, a low-dielectric inorganic film and a low-dielectric nano-porous film, and
    wherein the color filter array and the pixel electrodes are formed at the same side of the electrophoretic medium.

14. A method of forming an electrophoretic multi-color display device, the method comprising the acts of:
    forming a plurality of cells with an electrophoretic medium,
    forming pixel electrodes for selecting a subgroup of cells,
    forming a color filter array associated with the pixel electrodes,
    wherein the color filter array and the pixel electrodes are formed at the same side of the electrophoretic medium, and
    wherein the electrical contact between the pixel electrodes and a respective thin-film transistor is formed via cut-out portions in the color filter array.

* * * * *